(12) United States Patent
Ou

(10) Patent No.: US 9,194,415 B2
(45) Date of Patent: Nov. 24, 2015

(54) COAXIAL TENSIONABLE AUTOMATIC LOCK

(71) Applicant: Kindwin OPTO Electronic (Shenzhen) Co., Ltd., Shenzhen (CN)

(72) Inventor: Yongchao Ou, Shenzhen (CN)

(73) Assignee: KINDWIN OPTO ELECTRONIC (SHENZHEN) CO., LTD., Shenzhen (CN)

( * ) Notice: Subject to any disclaimer, the term of this patent is extended or adjusted under 35 U.S.C. 154(b) by 397 days.

(21) Appl. No.: 13/742,088

(22) Filed: Jan. 15, 2013

(65) Prior Publication Data

US 2014/0119817 A1    May 1, 2014

(30) Foreign Application Priority Data

Nov. 1, 2012   (CN) .......................... 2012 1 0429454

(51) Int. Cl.
| | |
|---|---|
| *F16B 17/00* | (2006.01) |
| *F16B 21/18* | (2006.01) |
| *F16B 9/02* | (2006.01) |

(52) U.S. Cl.
CPC .............. *F16B 21/186* (2013.01); *F16B 9/023* (2013.01); *Y10T 403/595* (2015.01)

(58) Field of Classification Search
CPC .... F16B 21/186; F16B 9/023; Y10T 403/595
USPC ............... 403/254, 255, 264, 321, 322.4, 360
See application file for complete search history.

(56) References Cited

U.S. PATENT DOCUMENTS

| | | | | |
|---|---|---|---|---|
| 2,646,713 | A * | 7/1953 | Summerbell | 411/530 |
| 4,354,808 | A * | 10/1982 | Ilg | 418/259 |
| 4,372,702 | A * | 2/1983 | Devaud | 403/24 |
| 4,394,097 | A * | 7/1983 | Horlacher | 403/360 |
| 4,474,492 | A * | 10/1984 | Fleitas | 403/322.4 |
| 4,667,916 | A * | 5/1987 | Richards | 248/343 |
| 4,728,132 | A * | 3/1988 | Brammall | 292/329 |
| 4,739,912 | A * | 4/1988 | Klawieter et al. | 223/85 |
| 4,815,908 | A * | 3/1989 | Duran et al. | 411/353 |
| 4,929,185 | A * | 5/1990 | Wong et al. | 439/74 |
| 4,947,704 | A * | 8/1990 | Gokee | 74/502.4 |
| 5,704,100 | A * | 1/1998 | Swan | 24/656 |
| 6,305,870 | B1 * | 10/2001 | Mita et al. | 403/254 |
| 6,685,378 | B2 * | 2/2004 | Huang et al. | 403/150 |
| 7,226,095 | B2 * | 6/2007 | Huang | 292/327 |
| 7,549,199 | B2 * | 6/2009 | Bugner | 24/297 |

(Continued)

FOREIGN PATENT DOCUMENTS

CN       201477822 U  *  5/2010

*Primary Examiner* — Victor MacArthur
(74) *Attorney, Agent, or Firm* — Tim Tingkang Xia, Esq.; Locke Lord LLP

(57) ABSTRACT

Disclosed is a coaxial tensionable automatic lock, including: a hollow connection rod (1), a top plate (3) and a bottom plate (4) respectively installed on two ends of the connection rod, a connection lock apparatus installed at a lower part of the connection rod and fixed on a surface of the bottom plate, wherein the connection lock apparatus includes: a flange (51) connected to a bottom end of the connection rod, a lock cover (52) sleeved onto an outer wall of the flange, a lock core (53) disposed inside an upper-end chamber of the flange, a lock washer (54) disposed between a lower end of the flange and an opened groove on a face of the bottom plate, and a lifting pin (2) installed in an upper-end hollow chamber of the connection rod, wherein a rotation handle (6) is sleeved onto an upper-end outer wall of the connection rod.

10 Claims, 6 Drawing Sheets

(56) References Cited

U.S. PATENT DOCUMENTS

| | | | |
|---|---|---|---|
| 7,613,012 B2* | 11/2009 | Hung et al. | 361/809 |
| 2002/0165033 A1* | 11/2002 | Horng et al. | 464/179 |
| 2006/0083582 A1* | 4/2006 | Balsells | 403/325 |
| 2009/0052151 A1* | 2/2009 | Hung et al. | 361/809 |
| 2009/0208278 A1* | 8/2009 | Cermak | 403/316 |
| 2010/0011548 A1* | 1/2010 | Rudduck et al. | 24/604 |
| 2011/0083372 A1* | 4/2011 | Cheng | 49/371 |

* cited by examiner

COAXIAL TENSIONABLE AUTOMATIC LOCK

CROSS-REFERENCE TO RELATED APPLICATIONS

This non-provisional application claims priority under 35 U.S.C. §119(a) on Patent Application No. 201210429454.1 filed in P.R. China on Nov. 1, 2012, the entire contents of which are hereby incorporated by reference.

FIELD OF THE INVENTION

The present invention relates to the field of joint locking parts, and in particular, to a coaxial tensionable automatic lock for splicing LED screens.

BACKGROUND OF THE INVENTION

Common installation lock parts are not humanized. During splicing of products, two persons are required to cooperate for operation, which is hard to operate and consumes time and manpower. Since the gravity center at the position of the fixing lock part is hard to locate, arc faces tend to appear after splicing. In addition, common installation lock parts do not have the distance-adjustment function, and consequently the spliced product tends to have gaps. These factors all affect the appearance of the product.

SUMMARY OF THE INVENTION

In view of the above defects in the prior art, the present invention is directed to providing a coaxial tensionable automatic lock.

The technical solution adopted by the present invention is to design a coaxial tensionable automatic lock, including: a hollow connection rod, a top plate and a bottom plate respectively installed on two ends of the connection rod, a connection lock apparatus installed at a lower part of the connection rod and fixed on a surface of the bottom plate, where the connection lock apparatus includes: a flange connected to a bottom end of the connection rod, a lock cover sleeved onto an outer wall of the flange, a lock core disposed inside an upper-end chamber of the flange, a lock washer disposed between a lower end of the flange and an opened groove on a face of the bottom plate, and a lifting pin installed in an upper-end hollow chamber of the connection rod, where a rotation handle is sleeved onto an upper-end outer wall of the connection rod.

A threaded connection pin fixed to the connection rod extends from a hollow tube on a bottom end of the connection rod, where the connection pin is fixedly connected to an upper end of the flange through threads.

An upper edge of the lock cover is provided with a first closing ring, where the closing ring and the lock cover are sleeved onto the outer wall of the flange, the closing ring and the flange are fixedly connected by using screws, and a lower end of the flange is fixedly connected to the bottom plate by using screws.

A bottom ring face of the flange is provided with two long circular grooves along a diameter direction thereof and four trapezoid holes are provided thereon.

An top surface of the lock washer is provided with a boss, the boss extending into the long circular grooves of the flange; a lower surface of the lock washer is provided with a catch; a first spring is disposed between an inner wall of the opened groove on the face of the bottom plate of the flange and the catch; and a second spring is disposed between the upper-end chamber of the flange, a top end of and the lock core.

A top of the lifting pin is a steeple, wherein a ring groove is disposed at a position below the steeple, a square opening passing through the lifting pin is disposed below the groove, a threaded block is disposed in the square opening, and a guide-rail groove is disposed at a position, corresponding to the square opening, in the upper end of the connection rod. The threaded block is a rectangular block, two symmetric side faces thereof are threaded arc faces, and a width of the threaded block is larger than diameter of the lifting pin and the connection rod. The rotation handle is a hollow rod, an inner wall thereof is provided with threads matching the threaded block, a bottom outer wall of the rotation handle is in a shape of a hexangular bolt; a disk fixed to the connection rod is disposed at the top of the connection rod, an upper-end outer wall of the rotation handle is fixedly connected to the second closing ring, a pressing disk is disposed below the closing ring, and the pressing disk is fixed onto the bottom face of the top plate by using screws.

The lock cover is rotatable around a vertical axial line, an upper-end cylinder surface thereof is provided with a plurality of vertical convex edges, a lower-end disk top surface thereof is evenly spacedly provided with a first identification groove, a second identification groove and a third identification groove, a reference identification groove is disposed at a position, on the surface of the bottom plate, corresponding to the identification groove; two drive grooves and two ring grooves are disposed on a lower-end disk bottom face of the lock cover, two bosses disposed on an top surface of the lock washer respectively extend into the two drive grooves, when the lock cover is rotated until the first identification groove and the second identification groove and the third identification groove are respectively aligned with the reference identification groove, the two bosses are respectively at a first position, a second position, and a third position in the drive grooves.

Through-holes for reducing weight are disposed on surfaces of the top plate and the bottom plate are provided, and two same-sized trapezoid openings for routing connection lines are disposed at axial lines of the top plate and the bottom plate.

Compared with the prior art, the present invention, adopting the coaxial and connection lock apparatus design, prevents phenomena of air face after products are spliced, achieves seamless splicing of the products, makes operations convenient, and reduces splicing costs.

DETAILED DESCRIPTION OF THE EMBODIMENTS

The following describes the present invention in detail with reference to accompanying drawings and specific embodiments.

Figure 1:
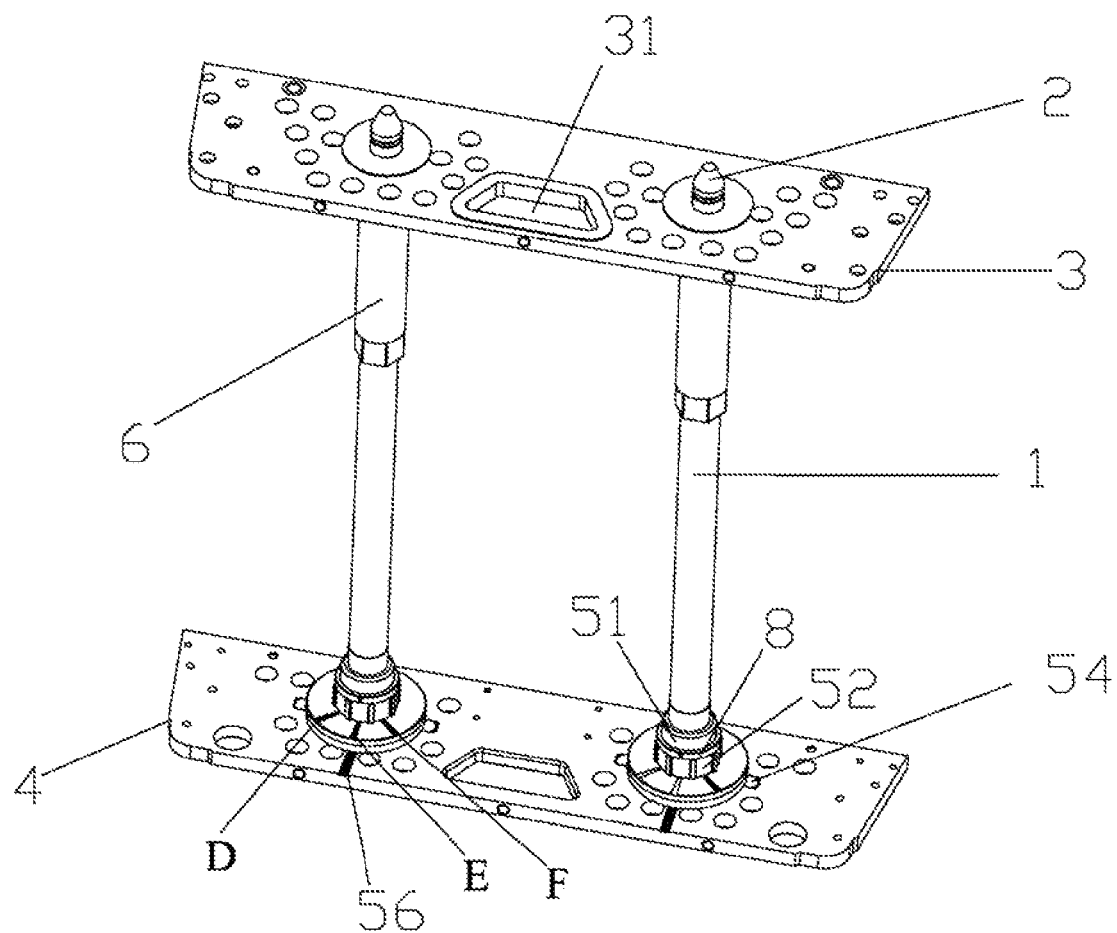
FIG. 1 is a three-dimensional schematic view according to an embodiment of the present invention.

FIG. 1 is a three-dimensional schematic view according to an embodiment of the present invention. In this embodiment, a coaxial tensionable automatic lock includes: a hollow connection rod 1, a top plate 3 and a bottom plate 4 respectively installed on two ends of the connection rod, a connection lock apparatus installed at a lower part of the connection rod and fixed on a surface of the bottom plate, where the connection lock apparatus includes: a flange 51 connected to a bottom end of the connection rod, a lock cover 52 sleeved onto an outer wall of the flange, a lock core 53 disposed inside an upper-end chamber of the flange, a lock washer 54 disposed between a lower end of the flange and an opened groove on a face of the bottom plate, and a lifting pin 2 installed in an upper-end hollow chamber of the connection rod, where a rotation handle 6 is sleeved onto an upper-end outer wall of the connection rod.

Figure 2:
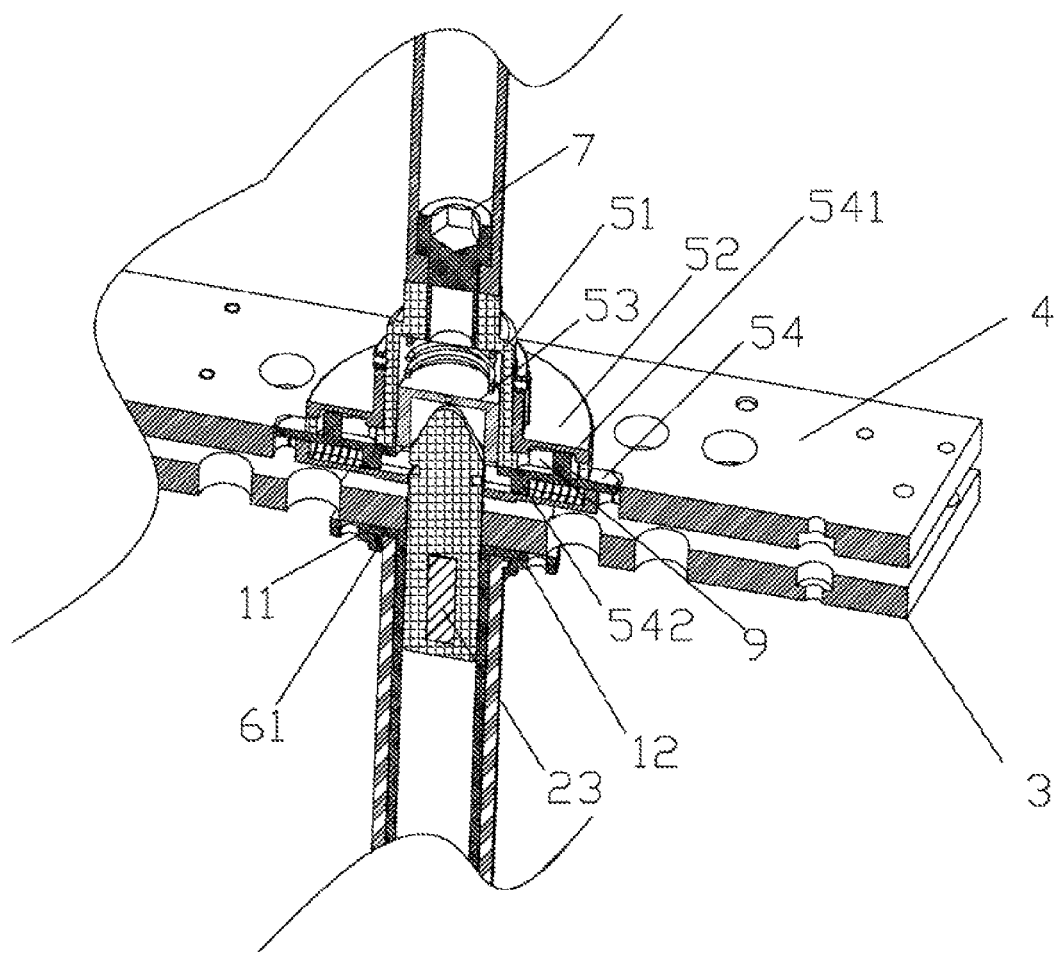
FIG. 2 is a partial sectional view of the embodiment illustrated in FIG. 1.

As shown in FIG. 2, a threaded connection pin 7 fixed to the connection rod extends from a hollow tube on a bottom end of the connection rod, where the connection pin is fixedly connected to an upper end of the flange 51 through threads. An upper edge of the lock cover is provided with a first closing ring 8, where the closing ring and the lock cover are sleeved onto the outer wall of the flange 51, the closing ring and the flange are fixedly connected by using screws, and a lower end of the flange is fixedly connected to the bottom plate 4 by using screws.

Figure 4:
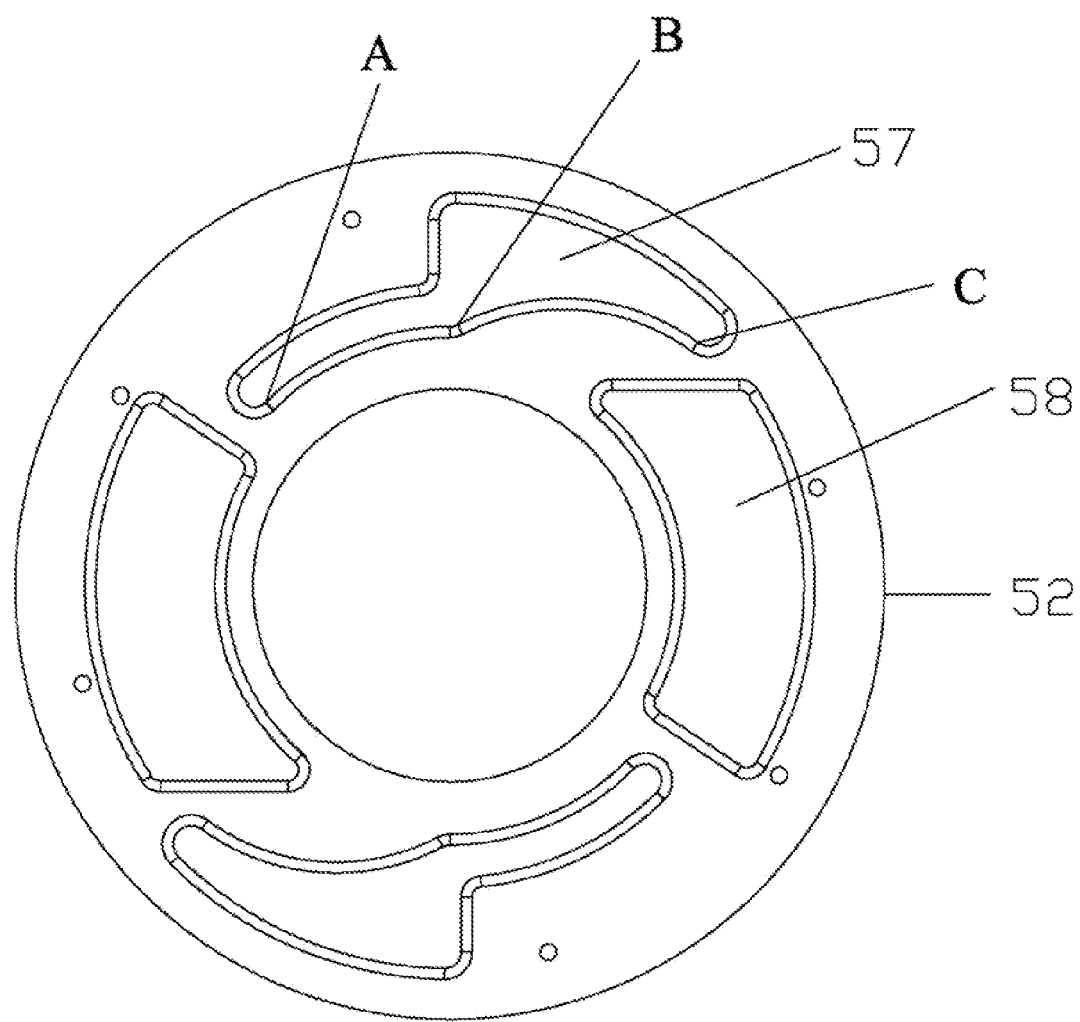
FIG. 4 is a schematic view of a bottom surface of a lock cover according to the embodiment illustrated in FIG. 1.

As shown in FIG. 1, FIG. 2 and FIG. 4, the lock cover is capable of rotating around a vertical axial line, an upper-end cylinder surface thereof is provided with a plurality of vertical convex edges, a lower-end disk top surface thereof is evenly spacedly provided with a first identification groove D, a second identification groove E and a third identification groove F, a reference identification groove 56 is disposed at a position, on the surface of the bottom plate 4, corresponding to the identification groove; two drive grooves 57 and two ring grooves 58 are disposed on a lower-end disk bottom face of the lock cover, two bosses 541 disposed on an top surface of the lock washer 54 respectively extend into the two drive grooves 57. Referring to FIG. 1 and FIG. 4, when the lock cover is rotated, and the first identification groove D and the second identification groove E and the third identification groove F are respectively aligned with the reference identification groove 56, the two bosses 541 are respectively at a first position A, a second position B, and the third position C in the drive grooves 57.

Figure 5:
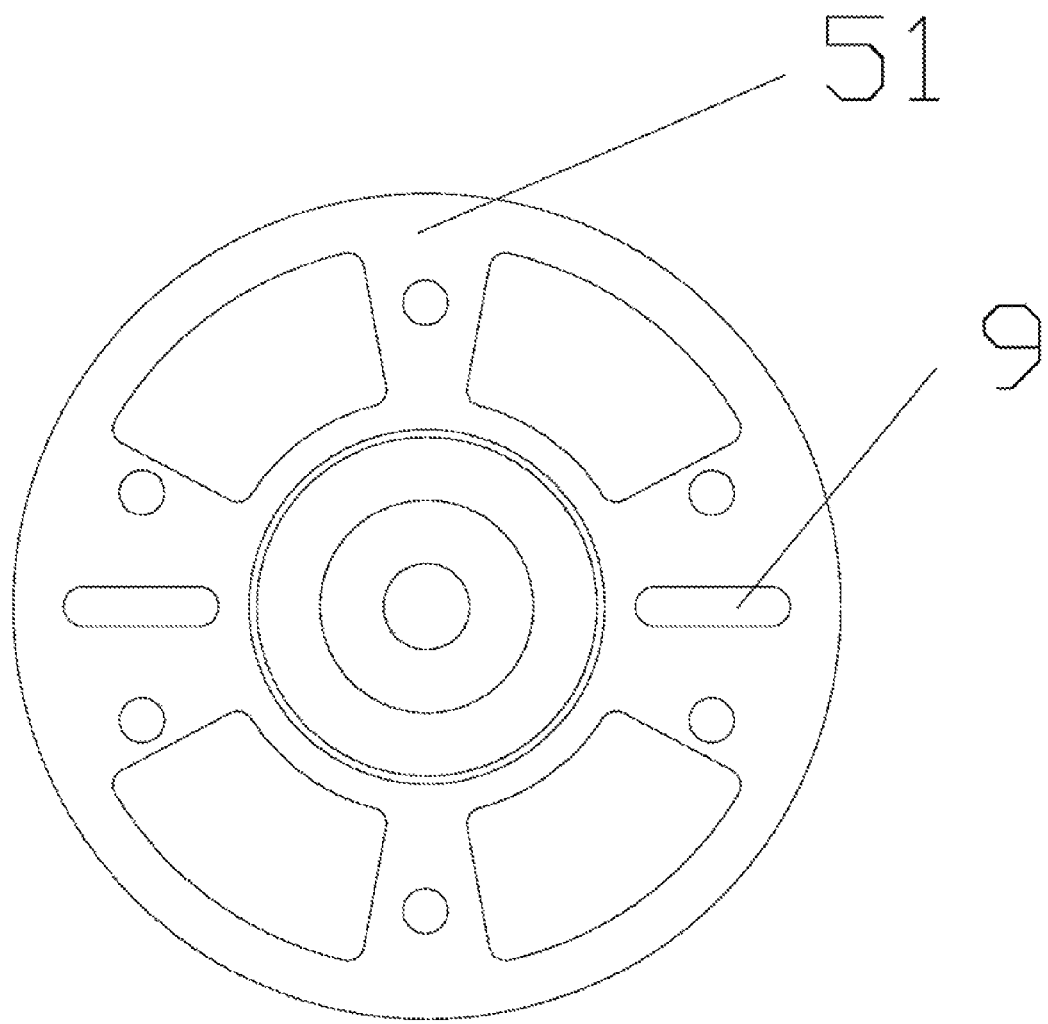
FIG. 5 is a top view of a flange according to the embodiment illustrated in FIG. 1.

As shown in FIG. 2 and FIG. 5, a bottom ring face of the flange is provided with two long circular grooves 9 along a diameter direction thereof and four trapezoid openings are provided thereon. Two bosses 541 disposed on an top surface of the lock washer 54 respectively extend upward from the two long circular grooves; a lower surface of the lock washer is provided with a catch 542; a first spring is disposed between an inner wall of the opened groove on the face of the bottom plate 4 of the flange and the catch; and a second spring is disposed between the upper-end chamber of the flange, and a top end of a lock core 53.

Figure 3:
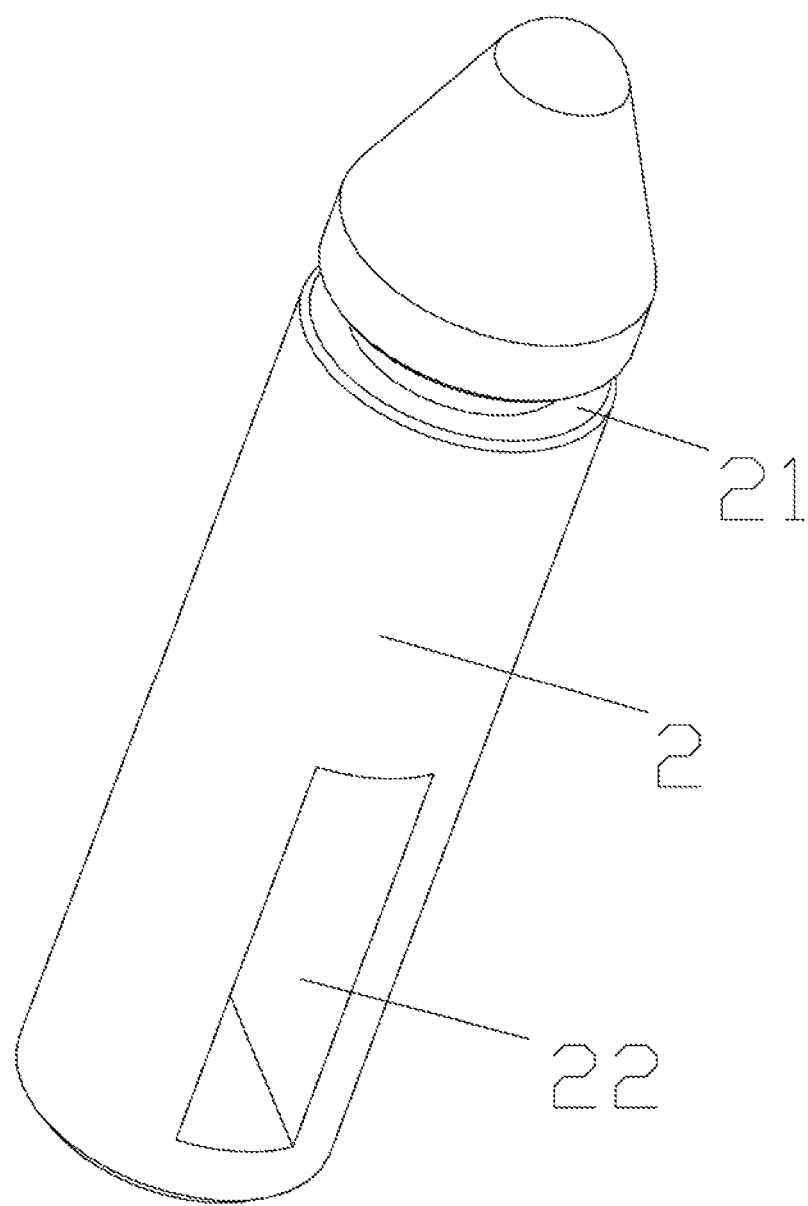
FIG. 3 is a three-dimensional schematic view of a lifting pin according to the embodiment illustrated in FIG. 1.
Figure 6:
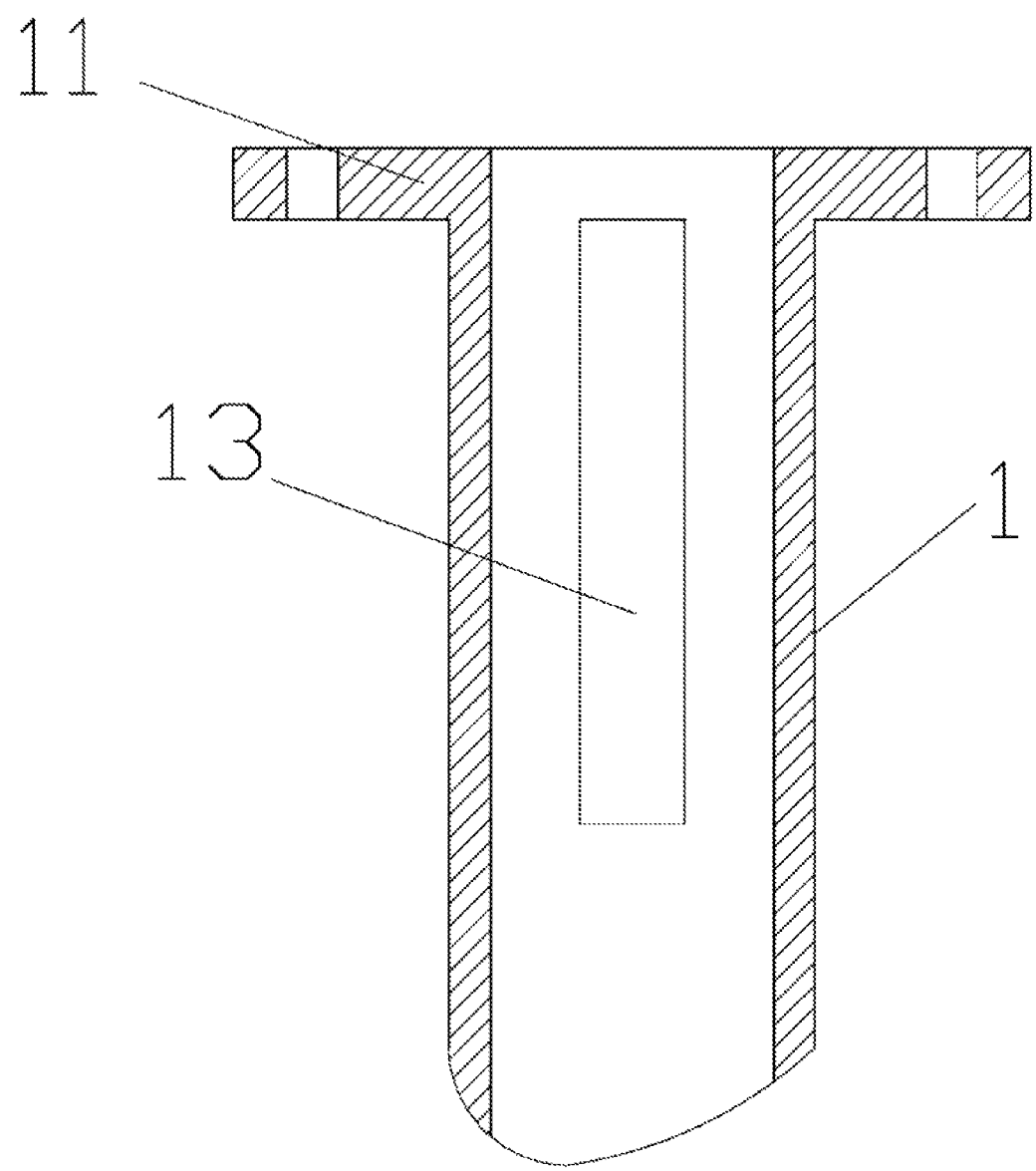
FIG. 6 is a partial sectional view of an upper end of a connection rod according to the embodiment illustrated in FIG. 1.

As shown in FIG. 2, FIG. 3 and FIG. 6, the lifting pin 2 extends from a hollow tube on a bottom end of the connection rod and passes through the top plate 3.

A top of the lifting pin is a steeple, where a ring groove 21 is disposed at a position below the steeple, a square opening 22 passing through the lifting pin is disposed below the groove, and a guide-rail groove 13 is disposed at a position, corresponding to the square opening, at the upper end of the connection rod; a long rectangular threaded block 23 with threaded arc faces on two symmetric side faces thereof passes through the guide-rail groove 13 and the square opening 22, and a width of the threaded block is larger than diameter of the lifting pin 2 and the connection rod 1; a rotation handle 6 is sleeved onto an upper-end outer wall of the connection rod, where the rotation handle is a hollow rod, an inner wall thereof is provided with threads matching the threaded block 23, and a bottom outer wall of the rotation handle is in a shape of a hexangular bolt.

Referring to FIG. 2, a disk 11 fixed to the connection rod is disposed at the top of the connection rod 1, an upper-end outer wall of the rotation handle 6 is fixedly connected to the second closing ring 61, a pressing disk 12 is disposed below the closing ring, and the pressing disk presses against and is fixed onto the bottom face of the top plate by using screws, and the pressing disk rotatably fixes the second closing ring onto the groove thereof.

Referring to FIG. 1, in an embodiment of the present invention, through-holes for reducing weight are disposed on surfaces of the top plate 3 and the bottom plate 4, and two same-sized trapezoid openings 31 for routing connection lines are disposed at axial lines of the top plate and the bottom plate.

In practical use, the lock cover is rotated clockwise so that the third identification groove F on the lock cover is aligned with the reference identification groove 56 on the bottom plate. In this case, the lock washer opens, and the boss is at the third position C in the drive grooves 57. Then, the lock cover is rotated counter-clockwise so that the second identification groove E is aligned with the reference identification groove on the bottom plate. In this case, the boss is at the second position B in the drive grooves, and the lock is in ready mode.

The lifting pin is inserted into a block hole. When the distance between the top plate and the bottom plate reaches a specific value, the lock washer automatically closes. Then, the lock cover is rotated counter-clockwise until the first identification groove on the lock cover is aligned with the reference identification groove D on the bottom plate. The boss is at the first position A in the drive grooves, and the lock is in locking mode. In the locking mode, the handle is rotated clockwise to implementing tight locking of the bottom plate and the top plate. Meanwhile, locking of the bottom plate and the top plate may be intensified by rotating the handle while holding the hexangular bolt-shape outer wall at the bottom of the handle using tools such as a wrench.

In the locking mode, the handle needs to be firstly rotated counter-clockwise, the bottom plate and the top plate are released, and the lock cover is rotated clockwise so that the third identification groove F on the lock cover is aligned with the reference identification groove on the bottom plate. In this case, the lock washer is separated, the lock is in separation mode, and the lifting pin can be removed from the lock hole.

In practice, when splicing and locking LED screens, each individual LED screen is placed between the top plate and the bottom plate of the apparatus, a plurality of combination units are spliced together and locked according the above connection locking process, and finally a desired entire LED screen is formed; and meanwhile, electric wires and cables are routed at the rear of the screen through the trapezoid openings on the top plate and the bottom plate.

The present invention, adopting the coaxial and connection lock apparatus design, prevents phenomena of air face after the products are spliced, achieves seamless splicing of the products, makes operations convenient, and reduces splicing costs.

The above-described are only exemplary embodiments for illustrating the present invention. It should be noted that persons of ordinary skill in the art may derive several variations and modifications without departing from the concept of the present invention. Such variations and modifications shall fall within the protection scope of the present invention.

What is claimed is:

1. A coaxial tensionable automatic lock, comprising: a hollow connection rod (1), a top plate (3) and a bottom plate (4) respectively installed on two ends of the connection rod, a connection lock apparatus installed at a lower part of the connection rod and fixed on a surface of the bottom plate, wherein the connection lock apparatus comprises: a flange (51) connected to a bottom end of the connection rod, a lock cover (52) sleeved onto an outer wall of the flange, a lock core (53) disposed inside an upper-end chamber of the flange, a lock washer (54) disposed between a lower end of the flange and an opened groove on a face of the bottom plate, and a lifting pin (2) installed in an upper-end hollow chamber of the connection rod, wherein a rotation handle (6) is sleeved onto an upper-end outer wall of the connection rod.

2. The coaxial tensionable automatic lock according to claim 1, wherein a threaded connection pin (7) fixed to the connection rod extends from a hollow tube on a bottom end of the connection rod (1), wherein the connection pin is fixedly connected to an upper end of the flange (51) through threads.

3. The coaxial tensionable automatic lock according to claim 1, wherein an upper edge of the lock cover is provided with a first closing ring (8), wherein the closing ring and the lock cover are sleeved onto the outer wall of the flange, the closing ring and the flange are fixedly connected by using screws, and a lower end of the flange is fixedly connected to the bottom plate (4) by using screws.

4. The coaxial tensionable automatic lock according to claim 1, wherein a bottom ring face of the flange is provided with two long circular grooves (9) along a diameter direction thereof and four trapezoid holes are provided thereon.

5. The coaxial tensionable automatic lock according to claim 1, wherein: an top surface of the lock washer (54) is provided with a boss (541), the boss extending into the long circular grooves (9) of the flange; a lower surface of the lock washer is provided with a catch (542); a first spring is disposed between an inner wall of the opened groove on the face of the bottom plate (4) of the flange and the catch;

and a second spring is disposed between the upper-end chamber of the flange, and a top end of the lock core (53).

6. The coaxial tensionable automatic lock according to claim 1, wherein a top of the lifting pin (2) is a steeple, wherein a ring groove (21) is disposed at a position below the steeple, a square opening (22) passing through the lifting pin is disposed below the groove, a threaded block (23) is disposed in the square opening, and a guide-rail groove (13) is disposed at a position, corresponding to the square opening, in the upper end of the connection rod.

7. The coaxial tensionable automatic lock according to claim 6, wherein the threaded block (23) is a rectangular block, two symmetric side faces thereof are threaded arc faces, and a width of the threaded block is larger than diameter of the lifting pin (2) and the connection rod (1).

8. The coaxial tensionable automatic lock according to claim 6, wherein the rotation handle is a hollow rod, an inner wall thereof is provided with threads matching the threaded block, a bottom outer wall of the rotation handle is in a shape of a hexangular bolt; a disk (11) fixed to the connection rod is disposed at the top of the connection rod (1), an upper-end outer wall of the rotation handle is fixedly connected to the second closing ring (61), a pressing disk (12) is disposed below the closing ring, and the pressing disk is fixed onto the bottom face of the top plate by using screws.

9. The coaxial tensionable automatic lock according to claim 1, wherein the lock cover (52) is rotatable around a vertical axial line, an upper-end cylinder surface thereof is provided with a plurality of vertical convex edges, a lower-end disk surface is evenly spacedly provided with a first identification groove D, a second identification groove E and a third identification groove F, a reference identification groove (56) is disposed at a position, on the surface of the bottom plate, corresponding to the identification groove; two drive grooves (57) and two ring grooves (58) are disposed on a lower-end disk bottom face of the lock cover, two bosses (541) disposed on an top surface of the lock washer (54) respectively extend into the two drive grooves, when the lock cover is rotated until the first identification groove D and the second identification groove E and the third identification groove F are respectively aligned with the reference identification groove (56), the two bosses (541) are respectively at a first position A, a second position B, and the third position C in the drive grooves (57).

10. The coaxial tensionable automatic lock according to claim 1, wherein through-holes for reducing weight are disposed on surfaces of the top plate (3) and the bottom plate (4), and two same-sized trapezoid openings (31) for routing connection lines are disposed at axial lines of the top plate and the bottom plate.

* * * * *